July 4, 1933. A. L. BAUSMAN 1,916,960
METHOD AND APPARATUS FOR MAKING CONFECTIONS
Filed Aug. 6, 1930    6 Sheets-Sheet 5
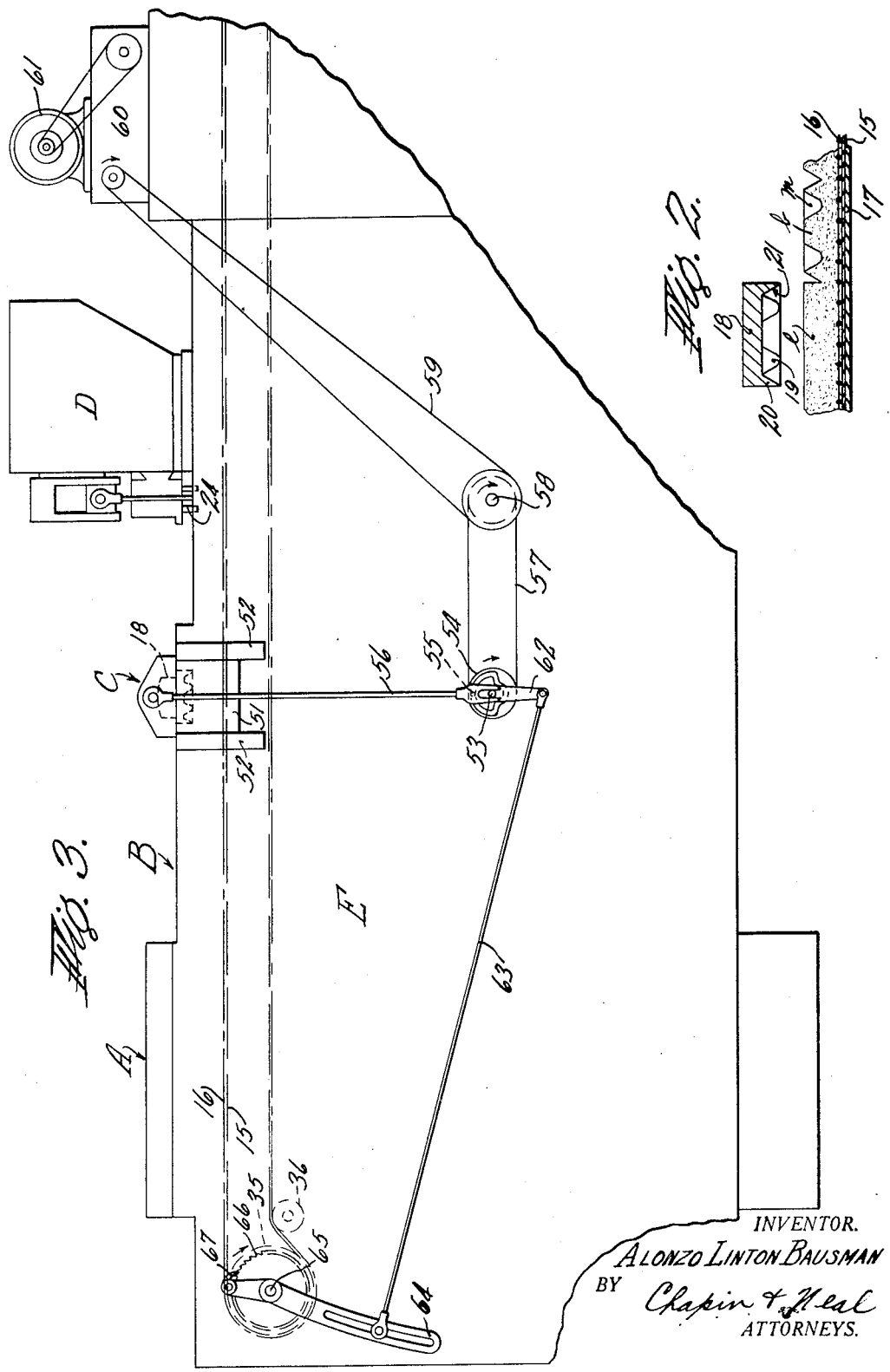
INVENTOR.
ALONZO LINTON BAUSMAN
BY Chapin & Neal
ATTORNEYS.

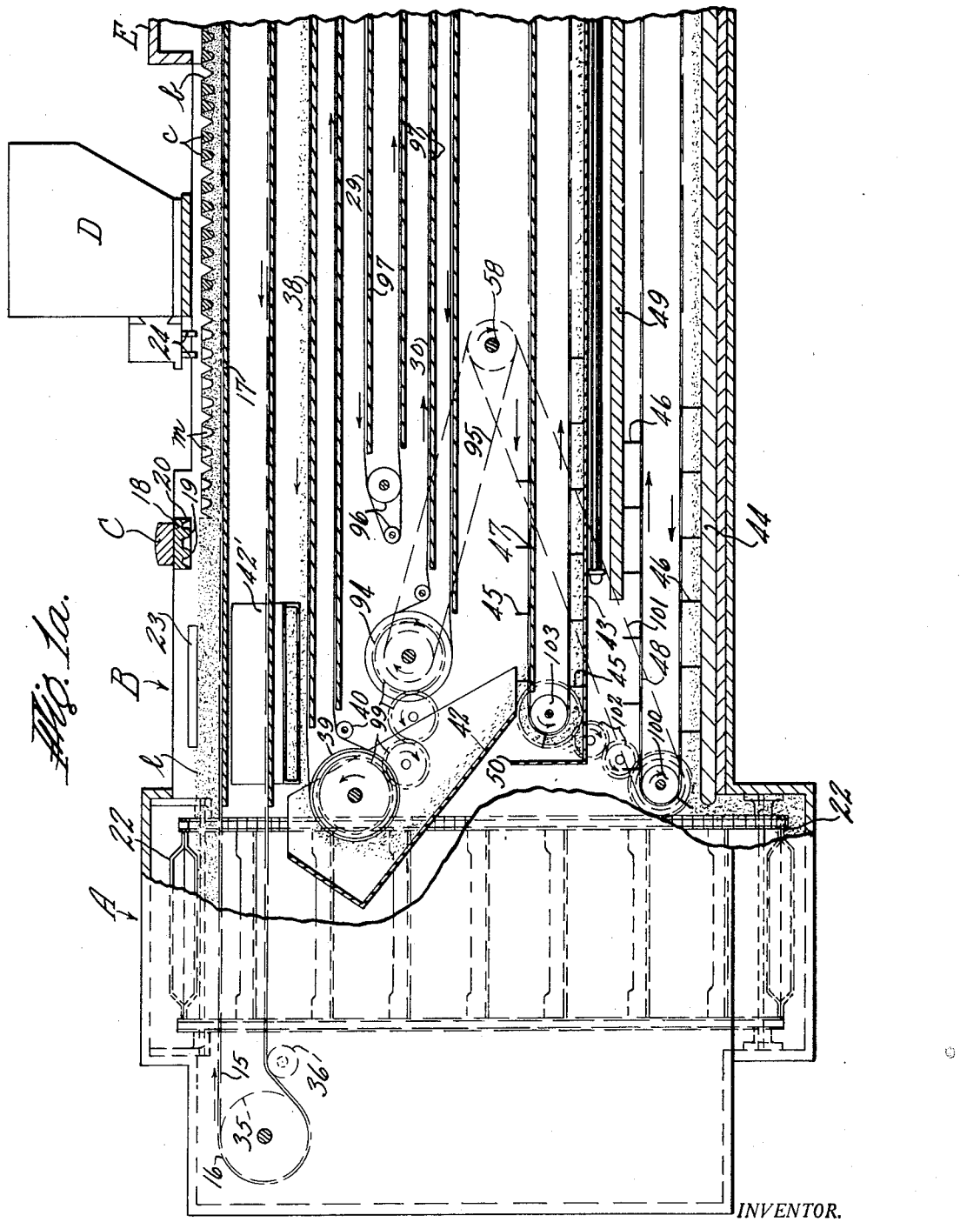

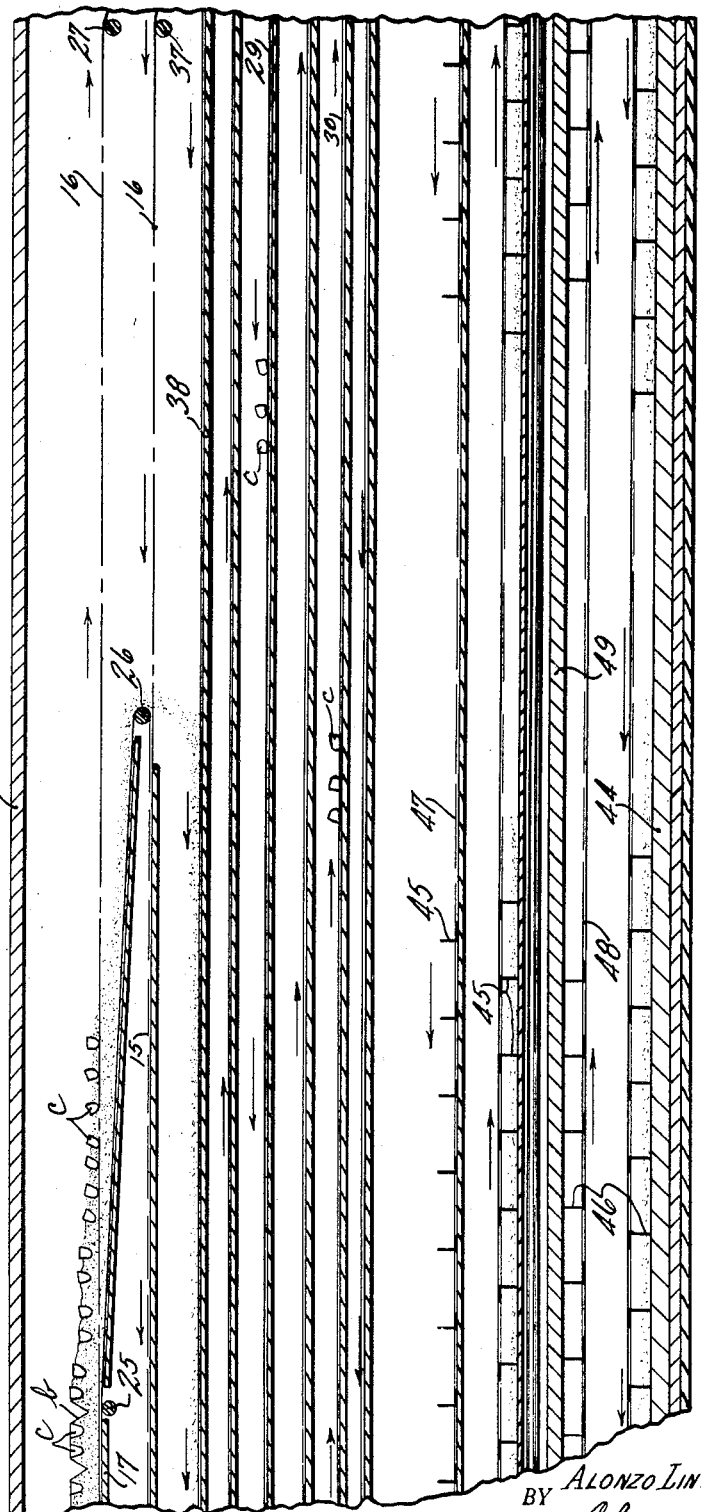

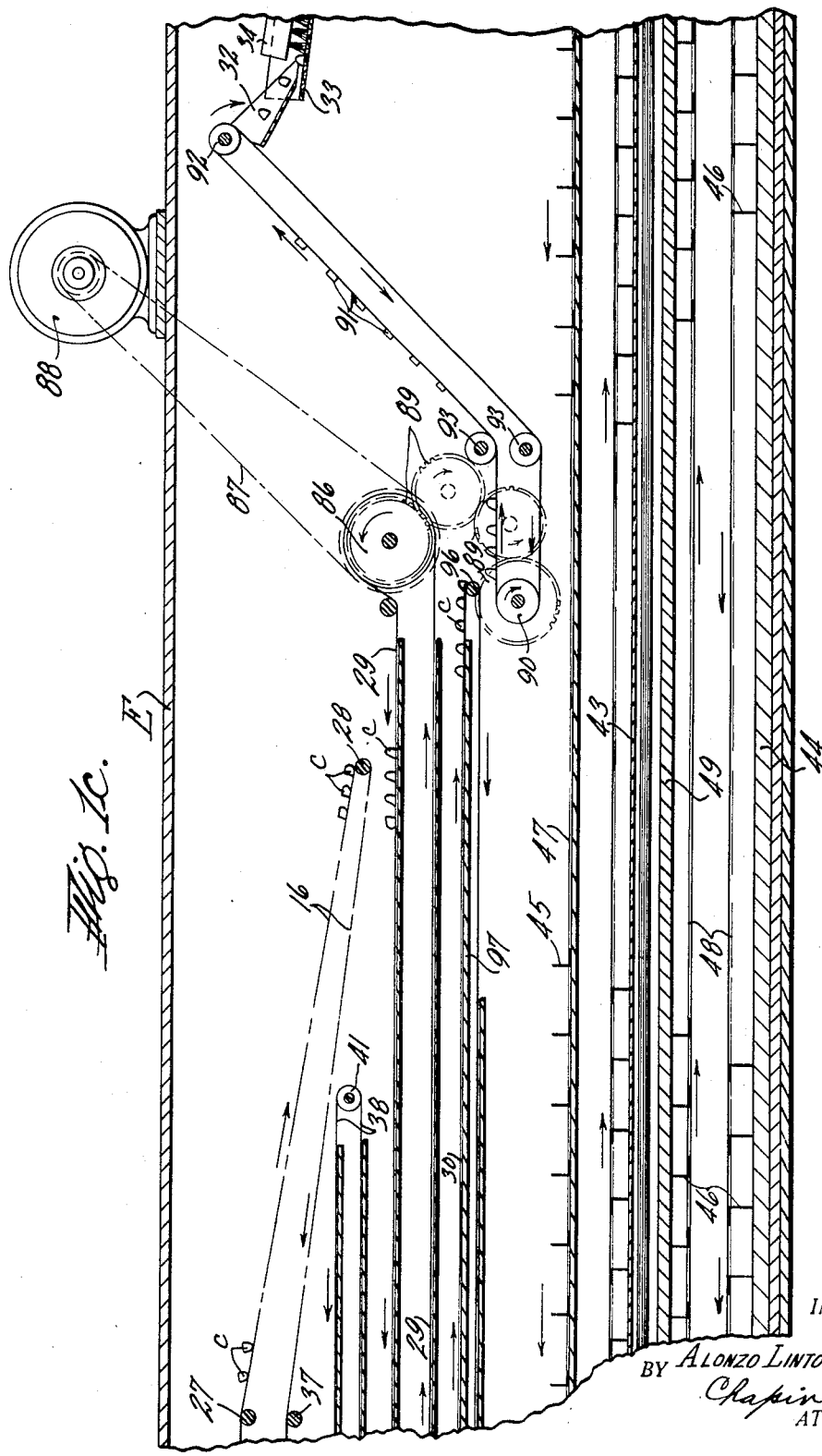

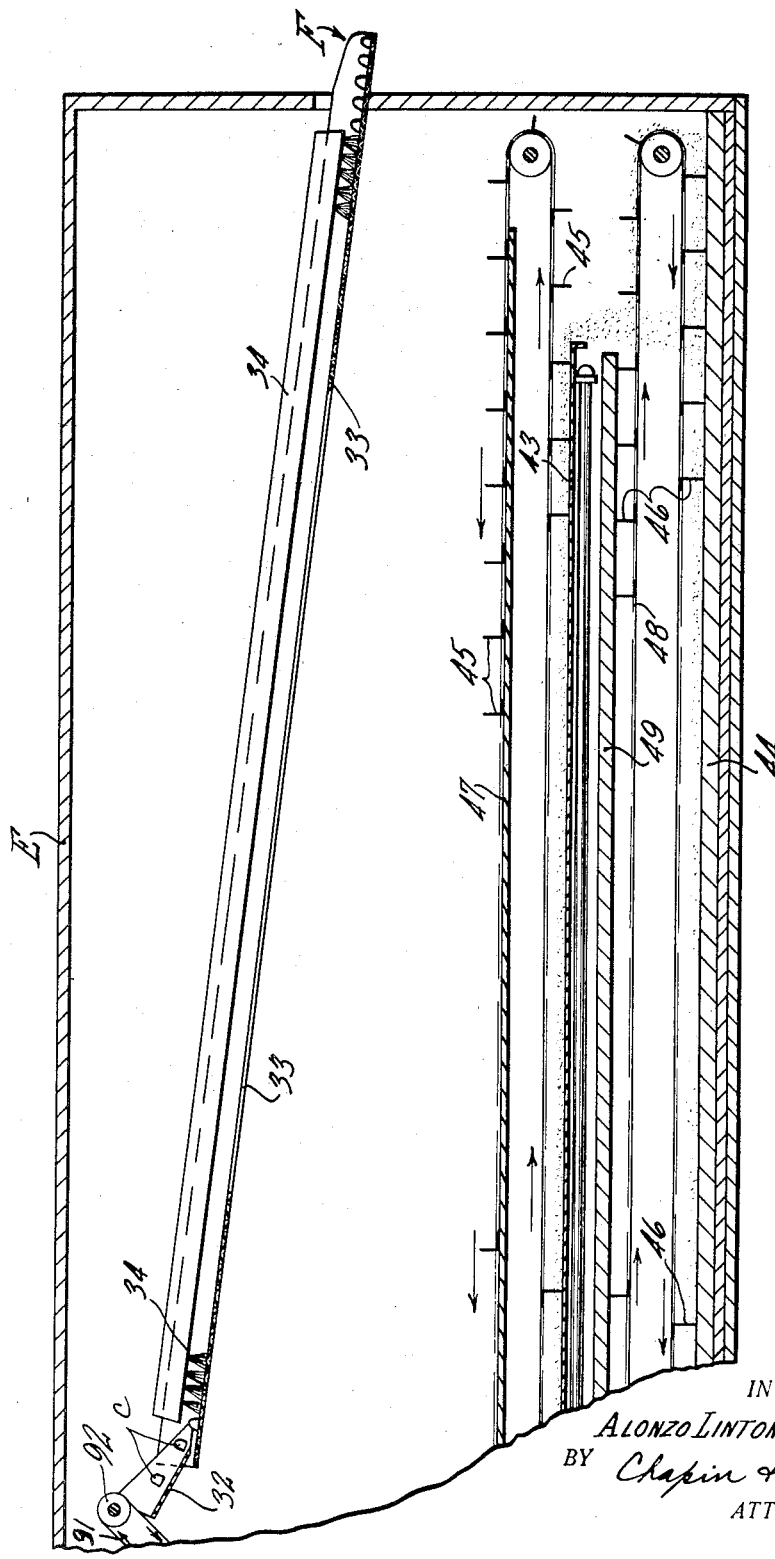

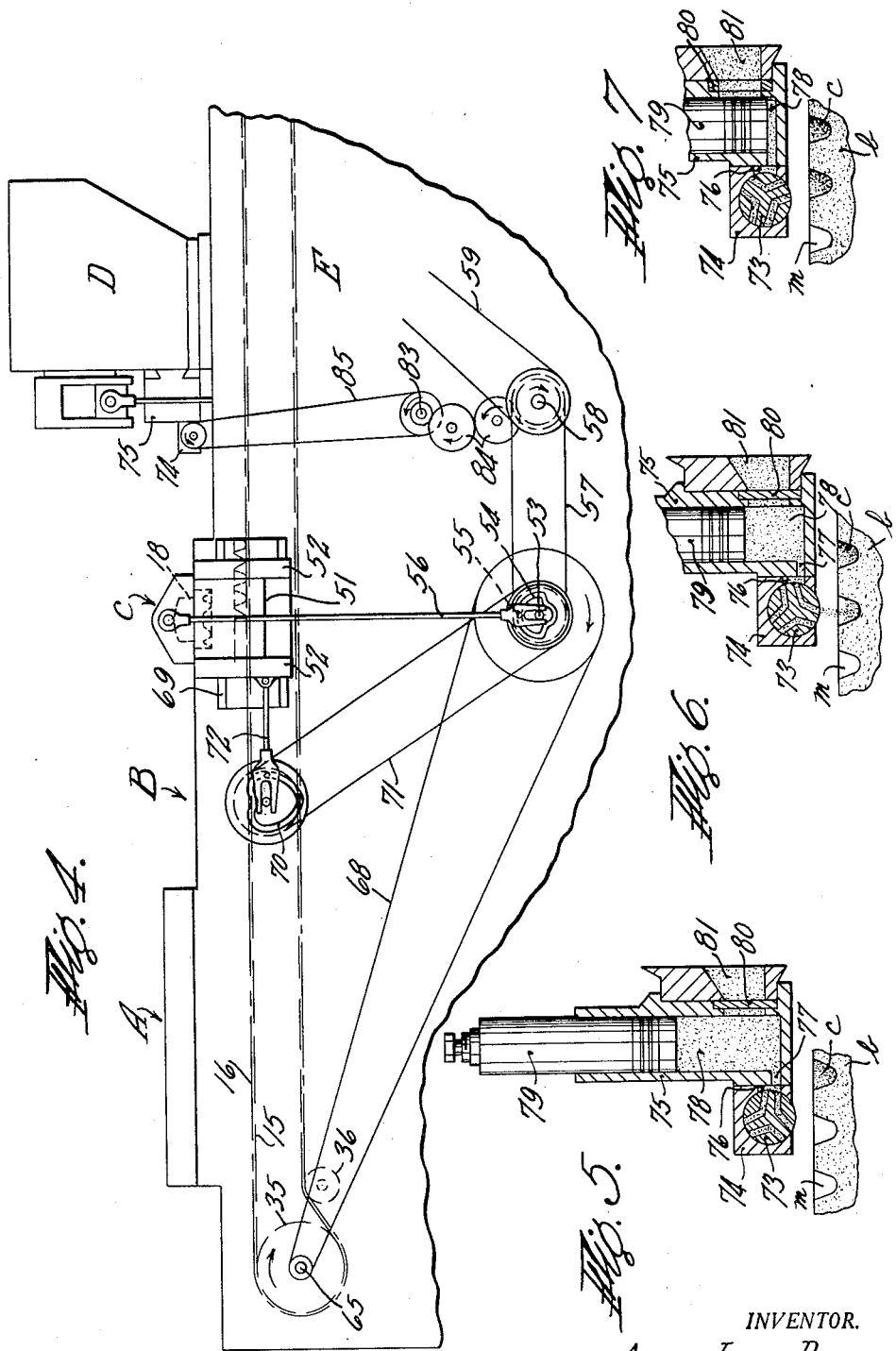

Patented July 4, 1933

1,916,960

UNITED STATES PATENT OFFICE

ALONZO LINTON BAUSMAN, OF SPRINGFIELD, MASSACHUSETTS

METHOD AND APPARATUS FOR MAKING CONFECTIONS

Application filed August 6, 1930. Serial No. 473,324.

This invention relates to improvements in the manufacture of confections by casting them in molds formed in starch or like material.

According to prior practice, wooden trays are successively filled with starch, molds are successively formed in the starch-laden trays by pressing patterns into the starch while confined in the tray, and the molds are successively filled with confection. These operations are all accomplished automatically and progressively. Thereafter, there is a break in the continuity of the manufacturing operation because the trays, containing the confections cast in starch, have to be set aside long enough for the confections to become thoroughly set or hardened. This setting operation is delayed because of the starch which surrounds the confections and acts as an insulator to retard the heat exchange between the confections and the surrounding atmosphere. Customarily, the filled trays are piled on trucks and manually transported to the cooling room where they are allowed to remain for a relatively long time. After the candies have set, the trays are successively inserted into a machine, which inverts the trays and dumps both starch and confections. The empty trays then pass on to be refilled with starch and treated as above described. The confections and starch drop upon a sieve through which the starch falls, leaving the confections on the sieve. The confections travel down the sieve and, after having been brushed or otherwise cleaned of the particles of starch adhering thereto, are delivered in finished form.

The practice just described has been the standard practice for many, many years. It is open to the objection that the manufacturing operation does not progress continuously. There is the interruption necessary to allow the cast confections to cool and the necessity for manually carrying the trays from the machine to the cooling room and back again. More than this, however, a large tray equipment is required and this is a considerable item of expense. The machine itself does not circulate the trays but uses each one only once during the day, after which it is set aside for a long period in the cooling room. Consequently, a very large number of trays is required and this is a serious objection from the candy maker's point of view.

My invention has for one object to provide for the manufacture of confections, cast in starch or the like, without requiring any trays whatever.

More particularly, the starch is spread in a layer on a conveyer, traveling continuously or intermittently as desired, and a printing member periodically descends on the traveling layer of starch, forming molds therein. This arrangement is characterized by a means which serves temporarily, much like the side walls of the former tray, to confine the starch against undue lateral movement during the mold forming operation.

The invention also has for an object improved provisions for the disintegration of the starch molds, characterized by the separation of the starch from the confections without dropping the latter. This enables the separation to be effected much sooner than heretofore and without waiting for complete setting of the confections. Since the confections are not dropped during separation, it is not necessary that they be fully set as heretofore, to withstand the impact incident to dropping. Also, by removing the starch from the confections, after they have set sufficiently to be self-sustaining and retain their shape, the remainder of the setting operation is materially accelerated.

More particularly, the starch layer, in which the molds are formed, is carried by a pervious conveyer, such as one made of wire mesh, and the openings in this conveyer are closed by an underlying impervious conveyer during the several operations of depositing and spreading the starch, of forming the molds, and of casting confections in the molds and also during enough subsequent travel of the molds to enable the confections to set sufficiently to be self-sustaining. After the confections have thus set, the impervious conveyer moves away from the pervious conveyer and the starch gradually falls through the openings of the latter upon the former, lowering the confections gently upon the pervious conveyer, on which they are retained.

The invention also contemplates a complete apparatus for casting confections in disintegrable starch molds, in which apparatus the manufacture proceeds progressively, and continuously if desired, from the point of formation of the starch into molds to the point of delivering the finished confections, free of starch and fully set. The confections, after having been separated from the starch, are conveyed through a tempering chamber until they are set sufficiently to withstand a brushing and cleaning action of the usual character. The starch is reconveyed to the layer-forming means and, during its travel, is preferably reconditioned to remove moisture therefrom.

Other objects will appear as the detailed description proceeds and will be pointed out in the appended claims.

The invention will be disclosed with reference to the accompanying drawings, in which—

Figs. 1a, 1b, 1c, and 1d are sectional elevational views which, when joined together end to end, afford a complete view of an apparatus embodying my invention;

Fig. 2 is a fragmentary sectional view illustrative of the mold forming means;

Fig. 3 is a fragmentary perspective view illustrative of the operating means for the mold forming and mold conveying means, as adapted for intermittent feeding movement of the molds;

Fig. 4 is a view taken similarly to Fig. 3 but showing the aforesaid operating means as adapted for continuous feeding movement of the molds; and Figs. 5, 6, and 7 are sectional elevational views illustrative of a depositing or mold filling means adapted for use with continuously traveling molds.

The method of and apparatus for forming the molds will first be described. Referring to Fig. 2, a continuous layer $l$ of starch of substantially even thickness is formed in any suitable way on any suitable support. In the illustrated embodiment, the support for the layer is really a belt 15 of canvas or any other suitable material, impervious to the passage of starch therethrough. Overlying this belt 15 is a pervious belt 16, such as one made of wire mesh fabric through which the starch will readily pass. The starch supporting belt 15 travels over a rigid and stationary supporting plate 17. However, as far as the broader aspects of the invention are concerned, the support may be of any suitable kind and need not necessarily be movable, as shown and described, although that is the preferably way if the full benefits of the invention are to be secured. Cooperating with the support, whatever its particular form may be, is a presser member or plate 18, disposed horizontally, above and parallel with the support and mounted to move toward and away from the same. This presser member carries one or more, and usually a plurality, of patterns 19, which on downward movement of the presser member are forced into the layer of starch to form mold recesses $m$. Surrounding the group of patterns 19 is an endless flange 20, fixed to and depending from the member 18 and forming a complete sidewall enclosure. This flange is preferably wedge-shaped in cross-section to facilitate insertion into the starch without undue disturbance of the same and the oppositely disposed inner faces 21 of this flange preferably diverge in a direction away from member 18 to give "draft" and allow withdrawal of the flange from the starch without breaking the molded starch, theretofore confined within its enclosing side walls. On descent of member 18, the patterns 19 and flange 20 will enter the starch layer $l$ and a portion of this layer will be marked off or divided off from the rest by the endless flange 20. The latter functions to confine the marked off portion of starch against undue lateral movement while the patterns 19 are being forced into it. The starch is compressed between the member 15 and member 18, and the patterns 19 force the starch laterally against the side walls formed by flange 20. The starch is thus compressed, within the confines of flange 20, both laterally and vertically and, on withdrawal of member 18, a self-sustaining block $b$ of starch is left, such block bearing the imprint of the patterns in the shape of smoothly formed mold recesses $m$. The blocks $b$ need not be completely separated one from the other, any more than is illustrated herein, and the term "divided off" is not to be so construed as to mean complete separation.

I have described what I now conceive to be the best method and apparatus for doing the work, but I recognize that, according to the broader features of my invention, the same result may be obtained by other means. I do not, for example, consider it essential, notwithstanding that it is desirable, to have the starch confining means affixed to, or a part of, the pattern carrying frame 18. The essential thing and the secret of success in forming molds in starch without using trays is to have some means which afford temporarily a complete side wall enclosure for confining the starch within due bounds against lateral movement while the molds are being formed.

Referring now to the apparatus as a whole, starch is deposited by the elevator 22 or any other suitable means on the conveyers 15 and 16 at the location A. As these conveyers travel to the right, the starch is spread and distributed into a layer $l$ of substantially even thickness by a leveller 23 at the location B. This leveller may be of the usual or any suitable type. As the conveyers continue their travel, molds are formed in the starch at location C and, on still further travel, the molds are carried into receiving relation with the nozzles 24 of a depositor D, which may be of the usual or any suitable type for ejecting measured quantities of confection into the underlying molds.

The conveyers then carry the filled molds to the right inside a long casing E in which the confections are caused to set in any suitable way. For example, a tempering fluid, such as cold air for example, may be circulated in casing E for the purpose of accelerating the setting of the confections. Should a warming medium be required, in certain cases, for the above purpose, that is within the scope of my invention. The casing E also extends to the left to underlie the depositor, mold forming and levelling devices and to house the starch elevator. Part of the casing E has been broken away to save space in the drawings (between Figs. 1a and 1b) and it will be understood that this part is arranged so that it affords a sufficiently long travel of conveyers 15 and 16 to cause a partial setting of the confections c as they are brought by conveyers 15 and 16 into the position shown in the extreme left-hand part of Fig. 1b. At this point, the confections c have set sufficiently to be self-sustaining. At this point, also, the impervious conveyer 15 begins to leave the pervious conveyer 16 and to travel on a downward inclination from roll 25 to roll 26 while conveyer 16 continues to travel horizontally forward to a roll 27. As a result, all the openings in conveyer 16 are uncovered and the starch blocks b, being no longer supported from below, break up and fall through the meshes of belt 16 upon belt 15, which carries the starch onwardly until it drops as belt 15 turns around roll 26. The confections c remain on belt 16.

It will be noted that the separation is a gradual one and the confections are gradually lowered until they are gently deposited on belt 16. There is no dropping of the confections from any substantial height as heretofore. Accordingly, the separation of starch and confections can be effected at an early stage and before the confections have fully set. It is only necessary that they become set enough to be self-sustaining.

The wire mesh belt 16, in traveling over the rollers, vibrates to some extent and this vibration aids in the separation of starch from the candies. Some particles of starch will be shaken off during the travel of belt 16 beyond roll 26 and between the latter and roll 27. From roll 27, belt 16 slopes downwardly to an end roll 28 and here the confections drop a short distance onto the upper stretch of a conveyer 29, which carries the confections backwardly through the tempering chamber and drops them on the upper stretch of travel of a conveyer 30. The latter carries the confections forwardly in the tempering chamber and delivers them to a conveyer elevator 31 which in turn delivers the confections to a chute 32, from which they slide into the usual longitudinally-reciprocable sieve 33. During the travel of the confections along the sieve, they are cleaned of any particles of starch adhering thereto by the action of a transversely swinging air brush 34, also of known form, which brushes the candies and at the same time blows air upon them. The finished confections are delivered at F as into a suitable receptacle or upon some suitable conveyer.

The pervious conveyer 16 and impervious conveyer 15 are trained over the same drive roll 35 and also over the same idler rolls 25 and 36. Between the rolls 35 and 25, these conveyers, in their upper stretch of travel, run over the stationary table 17. In the lower stretch of travel, these conveyers run in adjacent and substantially contiguous relation between rolls 26 and 36 but there is a substantial part of the lower stretch of travel of belt 16 (between rolls 26 and 28) where belt 16 is not covered by the belt 15. Consequently, the starch dropping from belt 15, as it turns around roll 26, and the starch dropping from confections c as they are carried along the upper stretch of belt 16, drops through this open part of the lower stretch of belt 16 and falls upon the upper stretch of an underlying canvas belt 38. This belt, which is trained over a driving roll 39 and idler rolls 40 and 41, receives the starch resulting from the disintegration of the molds and carries the same rearwardly in casing E to a position near the starch elevator and dumps the starch in a chute 42. This belt 38 also receives excess starch scraped off by the leveller 23 and not needed in the formation of layer l. Such excess starch, thrown from the sides of belts 15 and 16, passes into chutes 42', disposed one on each of said sides, and is conducted to belt 38, which carries it to chute 42.

The latter might deliver the starch directly to the starch elevator but it is usually desirable to first recondition the starch. For this purpose the starch is made to travel over a heated plate or table 43 and then over a cooling plate or table 44. Scrapers 45 and 46, carried by conveyers 47 and 48, respectively, push the starch over tables 43 and 44, respectively. The plates 43 and 44 are preferably separated by a wall 49 of insulation. Any suitable means may be employed to heat the table 43 and cool the table 44, as will readily be understood by those skilled in the art. It will be clear that the starch falling from the chute 42 is received by the upper stretch of conveyer 47 and carried a short distance to the left where it drops upon plate 43,—the latter having an upstanding end 50 to prevent escape of the starch. The scrapers 45 push the starch along the heated table 43 and the moisture in the starch is evaporated. The starch falls from the right-hand end of table 43 upon the underlying table 44 and the scrapers 46 push the starch along the table 44 which cools the starch. The cooled starch falls from the left-hand end of table 44 into the pit of the starch elevator to be subsequently raised by the latter and deposited on belts 15 and 16.

The starch elevator, the leveling device 23, the reciprocating sieve 33 and the reciprocating air brush 34 are of known construction and have been indicated in conventional form only in these drawings. For a complete disclosure of these elements, reference is made to my U. S. Letters Patent No. 1,169,602, granted January 25, 1916. The several elements, referred to, may be constructed, mounted, and driven as shown in said patent.

The depositor D may likewise be of the standard type where intermittent movement of belts 15 and 16 is employed. In such case also, the mold forming means would be vertically reciprocable and operated in a manner generally similar to those shown in said patent. For example, as shown in Fig. 3, the member 18 may have fixed to its ends slides 51 which are mounted to reciprocate vertically in ways formed in members 52 secured to the side of casing E. A shaft 53, mounted in said casing, carries path cams 54. Each cam operates a roll 55 fixed to a link 56, which is pivotally connected at its upper end to a slide 51. The lower end of link 56 is forked to straddle shaft 53 as a guide for its sliding movement. Shaft 53 may be driven by a sprocket chain 57 from a shaft 58, and the latter is driven by a belt 59 from a transmission 60, operated by an electric motor 61 or in any other suitable way. Shaft 53 also carries a crank 62 connected by a link 63 to a lever 64 which is pivotally mounted on the drive shaft 65 of drive roll 35. Fixed to shaft 65 is a ratchet 66 and lever 64 carries a pawl 67 to cooperate with the ratchet and effect intermittently movements of belts 15 and 16 by increments equal to the length of the starch blocks b.

Where continuous movement of conveyers 15 and 16 is employed, the shaft 65 of roll 35 is driven by a sprocket chain 68 from shaft 53 at a rate such that for each revolution of shaft 53 belts 15 and 16 are moved through the above stated distance. The mechanism for raising and lowering the mold printing member 18 is the same as before with the exception that the guideways 52 are mounted to slide horizontally on a guideway 69. A heart cam 70, driven by chain 71 from shaft 53, in the same direction and at the same speed, is arranged to reciprocate members 52 continuously back and forth in a horizontal direction with uniform motion by means of a link 72 similar in construction and mounting to link 56. The throw of the heart cam is equal to one half the distance through which conveyers 15 and 16 travel during each revolution of shaft 53. The printer 18 moves forward in the same direction and at the same speed as belts 15 and 16 for a distance equal to one half the length of the mold block $b$, and then moves back an equal distance at the same speed but, since its direction of travel is then opposite to that of belts 15 and 16, there results a relative longitudinal movement between these belts and the printer, equal to the length of block $b$. That is, while the printer moves back a distance equal to one half the length of block $b$, the belts 15 and 16 move forward an equal distance, and the total relative movement is equal to the sum of the movements of the belts and printer. The printer frame 18 is caused to move down and form the molds and move back during one half of the revolution of shaft 53 and all these operations occur while the heart cam 70 is moving the printer frame forwardly in the same direction and at the same speed as belts 15 and 16. During the return movement of frame 18, caused by the heart cam, the printer frame remains elevated, due to the 180 degree dwell on cam 54.

Where the starch molds travel continuously, the usual depositor mechanism will not of itself suffice, and I provide for this purpose the special additional provisions shown in Figs. 5, 6 and 7, capable of distributing the ejected charges to the molds while they are in motion. A continuously rotatable cylindrical member 73 is mounted in a housing 74, secured to the pump bar 75. This housing has a port 76 in constant communication with the outlet 77 of the pump cylinder 78. A portion of this member 73 lies outside the housing, projecting through the lower side thereof. The usual piston 79 is provided as well as the usual cut off bar 80, movable to open and close, at properly timed intervals, the passage 81, which connects the pump cylinder 78 to the supply hopper of the depositor. The piston 79 and cut off bar 80 are operated in the usual way by usual means, such for example, as those indicated in the above mentioned patent. The member 73 takes the place of the usual cut off bar associated with the discharge port of the cylinder 78 and instead of the pair of discharge nipples shown in Fig. 1a, the side outlet 77 is provided. Also, the pump piston and cut off bar will effect one complete cycle of operation during the time necessary for belts 15 and 16 to move a distance equal to the center to center distance between adjacent molds $m$. In Fig. 1, two molds are simultaneously filled and the depositing mechanism simply needs to make one complete cycle of operation while the belts 15 and 16 travel a distance equal to the length of the mold block b.

With the above preliminary explanations, the operation of the distributer should be clear from Figs. 5 to 7. The distributer makes one revolution for each three complete cycles of operation of the depositing mechanism. It has three angularly-shaped and angularly-spaced passages 82 extending therethrough, each successively acting at the proper time to connect at one end with the port 76 and at the other end to discharge the material under the force of piston 79. During the down stroke of the piston, one end of one passage 82, although moving, will maintain communication with port 76. The other end of the same passage will, during the same time, move from a position about like that shown in Fig. 5 to that shown in Fig. 6 and finally to that shown in Fig. 7. The result is that of a movable discharge nipple for the depositor, which nipple travels along for a time in the same direction as a mold m. Filling of a mold commences when the parts are positioned as in Fig. 5 and the deposit is completed when the parts assume the positions shown in Fig. 7. The mold m will thus be filled while moving continuously.

At the end of the mold filling operation, the cut off bar 80 opens passage 81 as shown in Fig. 7 and the distributer member 73 at such time closes off the passage 77, serving like a cut off bar. While the inlet to cylinder 78 is open and its outlet closed, piston 79 rises to suck in a fresh charge from the supply hopper. The cut off bar 80 then closes passage 81 and by this time the member 73 will have moved enough to bring another passage 82 into position to connect with the outlet of the pump cylinder. For roughly 60 degrees of its movement, member 73 serves as a cut off for the outlet of the pump cylinder and for roughly the next 60 degrees it serves as a distributer or movable discharge nozzle. The pump piston moves up during the first named 60 degree turning movement of member 73 and moves down during the last named 60 degree turning movement.

A drive shaft 83, indicated in Fig. 3, driven by gears 84 from the described shaft 58, but at twice the speed thereof, is provided as a means for driving the usual mechanism, shown in the aforesaid patent, for operating the pump piston 79 and cut off bar 80. The belts 15 and 16 will be so driven by chain 68 that they will move a distance equal to the center to center distance between adjacent molds m during one revolution of shaft 83. The molds m, as formed by the printer 18, will all be equally spaced so that the distance between adjacent molds in adjacent blocks b will be equal to the distance between the molds m in the same block. The distributer 73 is driven by a chain 85 from shaft 83 in such a way that it makes two thirds of a revolution during the interval in which the belts 15 and 16 move the molds m through a distance equal to the length of a block b or twice the distance between the centers of adjacent molds m.

For intermittent drive of belts 15 and 16, the usual mechanism, above referred to, for operating the pump piston and cut off bar, can be operated from shaft 58.

In accordance with usual practice, as disclosed in the aforesaid patent, the depositor may and usually does have a plurality of pistons, cylinders and discharge outlets or nipples arranged in one transverse row across belts 15 and 16. So also, there may be a plurality of patterns 19 arranged in two transverse rows.

The conveyers 29, 30, 31, 38, 47 and 48 may be driven in any suitable way and by any suitable means. As herein shown, they are driven continuously. An exemplary form of driving means for each of such conveyers is indicated in the drawings. Referring to Fig. 1c, the conveyer 29 has a drive roll 86 driven by a chain 87 from an electric motor 88. The shaft of drive roll 86 is connected by the gear train 89 to drive a roll 90 which operates the elevator 31. This elevator will have cleats 91, or equivalent means, to enable it to carry the confections in the upwardly inclined path shown. The elevator 31 is trained between the drive roll 90 and an end roll 92 and intermediate these rolls are idler rolls 93. The upper idler rolls simply engage the belt 31 near each edge so as to allow the passage of the confections without crushing them. The conveyer 30 has a drive roll 94 (Fig. 1a) which is driven by a chain 95 from shaft 58. Conveyers 29 and 30, in addition to their drive rolls have other idler rolls 96 and are, or may be, supported in their long stretches of travel by tables 97. The conveyer 38, which is mounted and supported much like the conveyers 29 and 30, has its drive roll 39 connected by the gear train 99 to the drive roll 94 of conveyer 30. The conveyer 48 has a drive roll 100 which is driven by a chain 101 from the described shaft 58 and the roll 100 is connected by a gear train 102 to the drive roll 103 of the conveyer 47. All the driving connections described may be arranged outside the casing E and on the back side thereof as viewed in Figs. 1a and 1c. The various shafts, rolls, tables and chutes may be supported within casing E in any suitable manner and it is thought unnecessary to an understanding of the invention to illustrate and describe all the details incident to the supporting of such parts.

In operation, starch is carried up by the elevator 22 in the usual and well understood way and deposited on the belts 15 and 16. These belts travelling, intermittently or continuously, as desired, carry the starch forwardly to a levelling device 23, which in the usual way forms the starch into a layer $l$ of substantially uniform thickness. This layer is carried forwardly to the mold forming device 18, or printer, which descends at the proper time forcing its patterns 19 and the encompassing endless flange 20 into the layer $l$, forming blocks $b$ of starch with molds $m$ therein. The molds thus formed are carried forwardly to the depositor D and filled. Where intermittent movement of molds $m$ is used, this filling operation may be performed in the usual way and when the molds move continuously, the mold filling means described in connection with Figs. 5, 6 and 7 may be used. The blocks $b$ with the molds $m$ therein filled with cast confections $c$, then enter the tempering chamber within casing E and are cooled or otherwise treated as may be necessary to cause the confections to set. After the confections have partially set and sufficiently so to enable the confections to retain their form if removed from the molds, the starch blocks $b$ are broken up. This is effected by the simple expedient of guiding the impervious conveyer 15 away from the pervious conveyer or wire belt 16. The support for the blocks $b$, having been thus removed, the starch, of which the blocks are composed, drops through the pervious conveyer as shown in Fig. 1b, leaving the confections $c$ on wire belt 16. By removing the starch, which theretofore surrounded the confections, the setting of the latter under the influence of the cooling or other means in casing E, is materially accelerated. The confections $c$, while carried by belt 16, are gently vibrated by the shaking of the belt and some of the starch clinging thereto will be removed in this manner. The belt 16 delivers the confections to a belt 29 and the latter to a belt 30,—these belts carrying the candies through the tempering chamber to complete the setting of the same. The confections, fully or sufficiently set, are delivered by conveyer 30 to the elevator 31 and carried thereby to the chute 32. The latter delivers the confections to a suitable cleaning means such as the vibrating sieve 33 and a cooperating air brush 34. As the confections pass down the sieve 33, the last traces of starch are removed therefrom and the confections, in finished form, emerge at the point F.

The starch which falls through belt 16 is received upon a belt 38 which carries the same to a chute 42. So also, the starch thrown off the sides of belts 15 and 16, as by leveller 23, is conducted by chutes 42' to belt 38 and thence to chute 42. The latter delivers the starch upon one end of a heated table 43 and the starch is carried along this table to the other end thereof by the scrapers 45 of the conveyer 47. In this way, the starch is freed of its moisture content. The dry starch falls from table 43 upon one end of a table 44, which is suitably cooled, and the starch is carried along this table by the scrapers 46 of conveyer 48 and delivered to the starch elevator 22.

The invention enables the candy manufacturer to dispense with the large equipment of trays formerly necessary with starch molding machines. It also enables the manufacture of the confections to be carried on continuously without the interruptions formerly necessary to enable setting of the confections. Manufacture of the confections progresses entirely automatically and without interruption, in a connected series of steps from the casting of the confections to the delivery of the same in finished form and free of starch. The invention thus marks a large step in advance in the art of manufacturing confections by casting them in starch molds.

What I claim is:

1. Apparatus for making confections, comprising, a pervious conveyer, an underlying impervious conveyer in part of its travel closing the openings in the pervious conveyer and in another part of its travel gradually moving away from the pervious conveyer and uncovering said openings, means for depositing starch-like material on the pervious conveyer and for spreading said material into a layer of substantially even thickness, means for forming mold recesses in said layer, means for casting confection in said recesses, said several means operable while the openings in the pervious conveyer are closed, and means for separating said conveyers after the cast confections have partially set whereby the starch-like material falls through the openings on the pervious conveyer leaving the confections thereon.

2. The method of making molded confections, consisting in forming molds in starch-like material, in casting confections in said molds, in causing the confections to become partially set while in said molds, in disintegrating the molds and gradually separating said material from the confections before the latter have fully set, and in completing the setting of the confections after the same have been removed from said material.

3. Apparatus for making molded confections, comprising, conveying means, means for supplying starch-like material thereto, means for forming molds in said material while carried by said conveying means, means for casting confections in said molds while the same are carried by said conveying means, tempering means through which the molds with the confections cast therein are carried and caused to set, and means effective before the confections have completely set to disintegrate the molds and separate the same from said confections and from said conveying means leaving the confections on the latter unsurrounded by said material to accelerate the setting of the confections under the influence of said tempering means.

4. Apparatus for making molded confections, comprising a conveyer having a plurality of openings therethrough, a support underlying said conveyor during a portion of its travel and closing the openings therein, means for depositing starch-like material on said conveyer, means for forming molds in the starch while carried by said conveyer, and means for casting confections in said molds while carried by said conveyer, said several means operating during said portion of travel of the conveyer, whereby during that portion of the travel of said conveyer beyond said support the starch-like material of which the molds are formed is free to fall through said openings leaving the confections substantially free of starch on the conveyer.

5. Apparatus for making molded confections, comprising, a foraminous conveyor, a support underlying said conveyor during a portion of its travel and closing the openings therein, means for depositing starch-like material on said conveyer, means for forming molds in the starch while carried by said conveyer, means for casting confections in said molds while carried by said conveyer, said several means operating during said portion of travel of the conveyer, whereby during that portion of the travel of said conveyer beyond said support the starch-like material of which the molds are formed is free to fall therethrough leaving the confections substantially free of starch on the conveyer, and a tempering apparatus through which the cast confections are carried by said conveying means after being separated from their molds and by which the confections are caused to set.

6. In combination, a continuously movable mold conveyer, a supply means for confection material, pump mechanism having an inlet connected thereto through which measured charges of confection are successively drawn in from said means and having an outlet through which said charges are successively expelled, means coordinating the operation of said mechanism with said conveyer so that one such measured charge is expelled during an interval of movement of the conveyer equal to the distance between successive molds, a distributer movably mounted with relation to said outlet to convey the expelled charge to a mold, and means for moving the distributer while said mechanism is expelling the charge so that the charge expelled therethrough is moved along with the continuously movable mold and received therein.

7. In combination, a continuously movable mold conveyer, a supply means for confection material, pump mechanism having an inlet connected thereto through which measured charges of confection are successively drawn in from said means and having an outlet through which said charges are successively expelled, means coordinating the operation of said mechanism with said conveyer so that one cycle of operation of the former occurs while the conveyer moves a distance equal to that between successive molds, a distributer movably mounted with relation to said outlet and having a passage to conduct confection from said outlet to a mold, means for moving the distributer in timed relation with the pump mechanism so that one end of said passage and outlet communicate during the discharge interval of said mechanism and so that such communication is cut off during the intake interval of said mechanism, the other end of said passage being moved in the direction of travel of the molds by the movement of the distributer and located to discharge into a mold while the latter is in motion.

In testimony whereof I have affixed my signature.

ALONZO LINTON BAUSMAN.